(12) United States Patent
Kappel et al.

(10) Patent No.: US 12,535,396 B2
(45) Date of Patent: Jan. 27, 2026

(54) SYSTEM FOR MONITORING WEAR OF A SOLID PLATE, SOLID PLATE, VEHICLE, METHOD FOR MONITORING WEAR, COMPUTER PROGRAM, COMPUTER READABLE MEDIUM AND CONTROL UNIT

(71) Applicant: Volvo Construction Equipment AB, Eskilstuna (SE)

(72) Inventors: Marc Kappel, Eskilstuna (SE); Bernd Lemke, Moringen (DE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 356 days.

(21) Appl. No.: 18/095,549

(22) Filed: Jan. 11, 2023

(65) Prior Publication Data
US 2023/0393046 A1 Dec. 7, 2023

(30) Foreign Application Priority Data
Jun. 7, 2022 (EP) .................................... 22177618

(51) Int. Cl.
| | |
|---|---|
| *G01N 3/56* | (2006.01) |
| *E01C 19/48* | (2006.01) |
| *E01C 23/00* | (2006.01) |
| *G01N 3/06* | (2006.01) |

(52) U.S. Cl.
CPC ............... *G01N 3/56* (2013.01); *E01C 19/48* (2013.01); *E01C 23/00* (2013.01); *G01N 3/06* (2013.01)

(58) Field of Classification Search
CPC .. G01N 3/06; G01N 3/56; E01C 19/48; E01C 23/00
See application file for complete search history.

(56) References Cited

U.S. PATENT DOCUMENTS

| | | |
|---|---|---|
| 9,618,437 B2 | 4/2017 | Marsolek et al. |
| 10,316,476 B2 | 6/2019 | Marsolek et al. |
| 2015/0003914 A1 | 1/2015 | Steinhagen et al. |

FOREIGN PATENT DOCUMENTS

EP 2637014 A1 * 9/2013 ............... G01N 3/56

OTHER PUBLICATIONS

Extended European Search Report, EP Application No. 22177618.0, mailed Nov. 8, 2022, 6 pages.

* cited by examiner

*Primary Examiner* — Jill E Culler
(74) *Attorney, Agent, or Firm* — Sage Patent Group

(57) ABSTRACT

A system for monitoring the wear of a solid plate having a surface exposed to abrasive wear and comprising: a through boring in the solid plate having a boring longitudinal axis (LA), a substantially cylindrical part, and an end part adjacent said surface, the end part having an end part surface being at least partly conical in cross-section along the boring LA, and a counter-sunk head screw having a screw LA, a shaft fitting into the cylindrical part, and a head with an underside at least partly conical in cross-section along the screw LA, a first angle between the underside and the screw LA bigger than a second angle between the end part surface and the boring LA, and a sensor at a fixed position on a side of the solid plate opposite said surface and adapted to measure a change in distance between a screw tip and the sensor.

17 Claims, 8 Drawing Sheets

SYSTEM FOR MONITORING WEAR OF A SOLID PLATE, SOLID PLATE, VEHICLE, METHOD FOR MONITORING WEAR, COMPUTER PROGRAM, COMPUTER READABLE MEDIUM AND CONTROL UNIT

CROSS REFERENCE TO RELATED APPLICATIONS

This application claims priority to European Patent Application No. 22177618.0, filed on Jun. 7, 2022, the disclosures and content of which is incorporated by reference herein in its entirety

TECHNICAL FIELD

The present disclosure relates to a system for monitoring wear of a solid plate, when being in use, has a surface being exposed to abrasive wear, the solid plate being in particular a metal plate of a vehicle, more particularly being a screed base plate and/or a conveyor plate of a paver. Further, the invention relates to a solid plate, in particular a metal plate of a vehicle, more particularly a screed base plate and/or a conveyor plate of a paver. Additionally, the present disclosure relates to a vehicle, in particular a paver. Further, the present disclosure relates to a method for monitoring wear of a solid plate, to a computer program, to a computer readable medium and to a control unit.

Various aspects of the present disclosure is applicable on vehicles. In particular, the present disclosure is applicable on working machines within the fields of industrial construction machines or construction equipment. For example, a paver is a working machine. Although the disclosure will be described with particular respect to a paver, the claim scope is not restricted to this particular machine but may also be used in other working machines such as wheel loaders, articulated haulers, excavators and backhoe loaders or any other vehicle in general. It may be preferred that the vehicle is an electric vehicle, in particular an electric paver or alike.

BACKGROUND

A system for monitoring a wear of a screed plate of a paving machine is disclosed in U.S. Pat. No. 9,618,437 B2. The system includes a sensor located on the screed plate. The sensor generates signals indicative of the wear of the screed plate. The system further includes a controller coupled to the sensor. The controller receives signals from the sensor and determines the wear of the screed plate based on the received signals.

SUMMARY

An object of the present disclosure is to provide an improvement for a system for monitoring wear of a solid plate, which, when being in use, has a surface being exposed to abrasive wear, for a solid plate, for a vehicle, for a method, for a computer program, for a computer readable medium and for a control unit. Preferably, an object is to provide a system, a solid plate, a vehicle, a method, a computer program, a computer readable medium and a control unit to improve monitoring wear of a solid plate, which, when being in use, has a surface being exposed to abrasive wear, the solid plate being in particular a metal plate of a vehicle, more particularly a screed base plate and/or a conveyor plate of a paver.

According to a first aspect, the object is achieved by a system according to claim 1.

The system is for monitoring the wear of a solid plate which, when being in use, has a surface being exposed to abrasive wear, the solid plate being in particular a metal plate of a vehicle, more particularly being a screed base plate and/or a conveyor plate of a paver. The system comprises a through boring in the solid plate. The boring has a boring longitudinal axis, a substantially cylindrical part, and an end part adjacent said surface. The end part has an end part surface. The end part surface is at least partly, preferably fully, conical in cross-section along the boring longitudinal axis. The system further comprises a counter-sunk head screw. The counter-sunk head screw can be made of metal and/or of plastic. The counter-sunk head screw has a screw longitudinal axis, a shaft fitting into the cylindrical part of the boring, and a head with an under-side being at least partly, preferably fully, conical in cross-section along the screw longitudinal axis. The boring may for example be a boring being machined directly into the solid plate. In another example the boring may be a boring in a bush which bush is part of the solid plate.

The system is characterized in that a first angle between the underside and the screw longitudinal axis is bigger than a second angle between the surface of the end part and the boring longitudinal axis. The system is further characterized in that a sensor is positioned at a fixed position on a side of the solid plate being opposite to said surface and being adapted to measure a change of a distance between a tip of the screw and the sensor.

In some aspects, the perception that in the above-referenced known system for monitoring a wear of a screed plate of a paving machine the sensor itself is positioned in the screed plate. Accordingly, not only the screed plate but also the expensive sensor is exposed to wear. This is a serious drawback since the sensor is a costly part which has to be replaced due to the wear.

In some aspects, the perception that by having a first angle between the underside and the screw longitudinal axis bigger than a second angle between the surface of the end part and the boring longitudinal axis, it is avoided a surface contact between the underside and the surface of the end part, when the screw is positioned into the through boring with the shaft of the screw fitting into the cylindrical part of the boring, for use. Instead, by having a first angle between the underside and the screw longitudinal axis bigger than a second angle between the surface of the end part and the boring longitudinal axis it is provided a line contact between these surfaces. When being in use, the screw is positioned into the through boring with, preferably an unthreaded part of, the shaft of the screw fitting into, preferably an unthreaded part of, the cylindrical part of the boring, so that the head of the screw, in particular a head surface of the head of the screw, is part of the surface being exposed to wear, when the solid plate is in use. The effect of the aforementioned line contact leads to the further advantageous effect that wear of the head of the screw makes a width of the head surface smaller, the width being a width being measured lateral to the longitudinal axis of the screw. And the reduction in width caused by said wear leads to the further advantageous effect that a circumference of the line contact of the head of the screw with the conical part of the boring is reduced. This leads to the further advantageous effect that the screw can move along the conical part of the end part surface of the boring in a direction away from the surface being exposed to wear. And that leads to the further advantageous effect the tip of the screw is moved, in particular moved by the forces causing the abrasion, nearer to the sensor which reduction in distance can be measured by the sensor.

By the provision of a system for monitoring the wear of a solid plate which, when being in use, has a surface being exposed to abrasive wear, the solid plate being in particular a metal plate of a vehicle, more particularly being a screed base plate and/or a conveyor plate of a paver, the system comprising a through boring in the solid plate, the boring having a boring longitudinal axis, a substantially cylindrical part, and an end part adjacent said surface, the end part having an end part surface being at least partly conical in cross-section along the boring longitudinal axis, and a counter-sunk head screw having a screw longitudinal axis, a shaft fitting into the cylindrical part of the boring, and a head with an under-side being at least partly conical in cross-section along the screw longitudinal axis, which system is characterized in that a first angle between the underside and the screw longitudinal axis is bigger than a second angle between the surface of the end part and the boring longitudinal axis, and in that a sensor is positioned at a fixed position on a side of the solid plate being opposite to said surface and being adapted to measure a change of a distance between a tip of the screw and the sensor, it is in particular provided a robust and cost effective monitoring of wear of such kind of a solid plate, and it is more particularly provided the advantage of replacing the solid plate without having the necessity to also replace the costly sensor.

An advantage that may be achieved with the various aspects is that the sensor is not affected by the wear of the solid plate, so that it is possible to use a very accurate and therefore possibly costly sensor on the one hand. On the other hand it is advantageously possible to use a very cheap part in the form of the counter-sunk head screw as the part which is helping indicating the wear to the sensor. Therefore, only a cheap part is exposed to the wear which is imposed on the surface of the solid plate.

Another advantage that may be achieved is that the part which is sensing the wear is split into two parts, one part in the form of the screw being exposed to the wear, the other part in the form of the sensor not being exposed to the wear but sensing a change in position of the screw in the through boring.

A further advantage that may be achieved is that a shape and a smoothness of the end part surface of the boring, a shape and a smoothness of the underside of the head of the screw, and/or the characteristics of the applied sensor can each be used and/or adapted to provide either a continuous sensor signal, a sensor signal in steps or just a good/bad sensor signal.

Another advantage that may be achieved is that it is possible to retrofit an existing solid plate by using a possibly existing through boring in the solid plate and replace a regular bolt or screw in such boring by the counter-sunk head screw of the present invention. This can save substantial costs when compared with the purchase and replacement of a completely new solid plate.

According to an embodiment, the first angle is about 15 degrees bigger than the second angle. Such a difference has been found particularly useful to provide the afore-mentioned effects. Preferably the first angle being about 30 degrees, and the second angle being about 15 degrees. Such angles have been found particularly useful to provide the afore-mentioned effects.

According to an embodiment, the difference in degrees between the first angle and the second angle is adapted so that a change of the position of the tip of the screw relative to the sensor is not proportional to an amount of wear of the surface being exposed to the abrasive wear, when the screw being in use, in particular by being inserted into the boring so that the head of the screw is also being exposed to the abrasive wear. This provides the possibility to adapt the change of the position of the tip of the screw relative to a sensitivity and/or a detection range of the sensor.

According to an embodiment the difference in degrees between the first angle and the second angle is adapted so that a change of the position of the tip of the screw relative to the sensor is less than a reduction of a thickness of the plate due to the abrasive wear, when the screw being inserted into the boring so that the head of the screw is also being exposed to the abrasive wear. This provides the possibility to better adapt the change of the position of the tip of the screw relative to a sensitivity and/or a detection range of a standard sensor, in particular a standard proximity sensor.

According to an embodiment a system is provided, wherein, when the screw being inserted into the boring, the screw is exposed to a pulling force of the solid plate which pulling force is adapted to pull the screw into the boring, so that the underside of the screw comes into, preferably line-like, contact with a conical section of the end part surface of the boring, preferably the pulling force acting along a direction substantially parallel to the boring longitudinal axis. Such pulling force supports the force on the screw which is generated by the abrasive wear. In particular, such pulling force makes sure that the screw is also forced into the boring even when there is temporarily no abrasive force to hold and/or push the screw into the boring.

According to an embodiment a spring is located on a side of the solid plate being a far side with respect to the surface being exposed to the abrasive wear, wherein, when the screw being inserted into the boring, the spring is adapted to expose the screw to a pulling force pulling the screw into the boring, so that the underside of the screw comes into, preferably line-like, contact with a conical section of the end part surface of the boring, preferably the pulling force acting along a direction substantially parallel to the boring longitudinal axis. By using a spring to generate the pulling force it is possible to provide the pulling force by using a reliable, easy and cheap element.

According to an embodiment the screw comprises an abutment element, the abutment element being located adjacent the tip of the screw on a side of the plate being a far side with respect to the surface, the abutment element being mounted on the screw so that it can not move along the screw, in particular not along a direction substantially parallel to the boring longitudinal axis. This provides a defined position at the screw on which a pulling force can act. Preferably the abutment element is comprising a nut and a counter nut. This is a reliable, easy and cheap realisation of the abutment element. Preferably the spring is clamped between the solid plate and the abutment element.

According to an embodiment the end part surface of the boring and/or the underside of the head of the screw is substantially smooth, for example smooth like a typical industrial metal surface, for providing that a change of the position of the tip of the screw relative to the sensor is taking place substantially stepless and/or is taking place in substantially infinite small steps, when the screw being inserted into the boring so that the head of the screw is also being exposed to the abrasive wear.

According to an embodiment the sensor is a proximity sensor. Using a proximity sensor is a reliable and accurate embodiment of the sensor.

According to an embodiment the system, in particular the sensor, being adapted to provide the change of the distance wirelessly to a control unit and/or a customer of the system and/or a dealer of the system. This facilitates capturing and/or further processing of sensor data indicating the change of the distance.

According to a further aspect, the object is achieved by a solid plate according to claim 12, in particular a metal plate of a vehicle, more particularly a screed base plate and/or a conveyor plate of a paver, the solid plate comprising a system according to the invention disclosed herein. As to the advantages, preferred embodiments and details of the solid plate, reference is made to the corresponding aspect and embodiments of the system described herein above as well as of the further aspects and their embodiments described herein below.

According to a further aspect, the object is achieved by a vehicle according to claim 13. In particular, the vehicle is a paver. The paver may be powered for example by a diesel engine or may for example be an electric paver with one or more batteries and one or more electromotors. The paver may also be powered by a hybrid solution, for example by using a diesel engine and also by using one or more electromotors. The vehicle comprises a system and/or a solid plate as described above. As to the advantages, preferred embodiments and details of the vehicle, reference is made to the corresponding aspect and embodiments of the system and/or solid plate described herein above as well as of the further aspects and their embodiments described herein below.

According to a further aspect, the object is achieved by a method according to claim 14 for monitoring the wear of a solid plate, in particular a solid plate as described above. In particular, the method is adapted for a mobile working machine, preferably for a paver. As to the advantages, preferred embodiments and details of the method, reference is made to the corresponding aspects and embodiments described herein above as well as of the further aspects and their embodiments described herein below.

According to a further aspect, the object is achieved by a computer program according to claim 15. The computer program comprises program code means for performing the steps described above when said program is run on a computer. As to the advantages, preferred embodiments and details of the computer program, reference is made to the corresponding aspect and embodiments described herein above as well as of the further aspects and their embodiments described herein below.

According to a further aspect, the object is achieved by a computer readable medium according to claim 16. The computer readable medium is carrying a computer program comprising program code means for performing the steps described above when said program product is run on a computer. As to the advantages, preferred embodiments and details of the computer readable medium, reference is made to the corresponding aspect and embodiments described herein above as well as of the further aspect and their embodiments described herein below.

According to a further aspect, the object is achieved by a control unit according to claim 17. The control unit is configured for controlling a system described above and/or for controlling a solid plate described above and/or for controlling a vehicle described above, wherein the control unit is configured to perform the steps described above. As to the advantages, preferred embodiments and details of the control unit, reference is made to the corresponding aspect and embodiments described herein above.

Further embodiments, advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples. In the drawings and the following detailed description of the drawings, identical elements or elements with the same function are indicated with the same reference numeral.

In the drawings.

DETAILED DESCRIPTION

Figure 1:
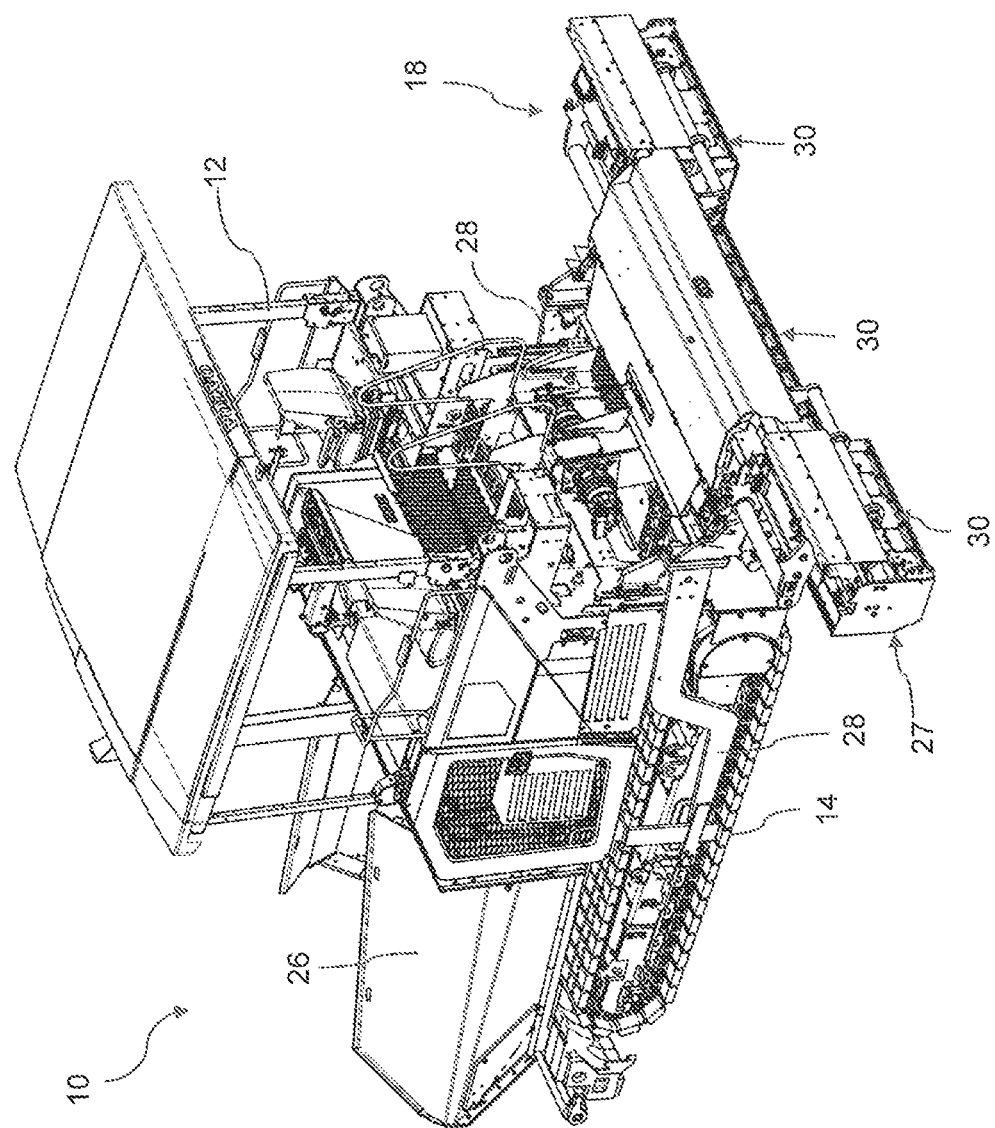
FIG. 1 is a perspective view of a paver according to a preferred embodiment.

FIG. 1 is a perspective view of a paver 10 according to a preferred embodiment comprising a system according to the invention according to a preferred embodiment. The paver 10 comprises a frame 12 with a set of ground-engaging elements 14 such as tracks or wheels coupled with the frame 12. The elements 14 may be driven by an engine inside the frame in a conventional manner. The engine may further drive an associated generator in a conventional manner to drive a screed 18 of the paver 10. The paver may also be a fully electric paver with at least one battery and at least one electromotor. The paver may also be powered by a hybrid solution, for example by using a conventional engine and one or more electromotors. The screed 18 is attached at the rear end of the paver 10 to spread a compact paving material into a mat. The paver 10 additionally comprises a hopper 26 for storing paving material, and a conveyer system to move the paving material from the hopper 26 to a deflector plate 27 in front of the screed 18. Due to the movement of the paver 10 the paving material is then forced under a screed base plate 30 of the screed 18.

The screed 18 is pivotally connected behind the paver 10 by a pair of tow arms 28 that extend on each side of the frame 12 of the paver 10 between the frame 12 and the screed 18. Tow arms 28 are connected to frame 12 in a pivotable manner so that the position and orientation of the screed 18 relative to the frame 12 and to the surface being paved may be adjusted by raising or lowering the tow arms 28 to control the thickness of the paving material deposited by the paver 10 below the base plate 30 of screed 18.

Figure 2:
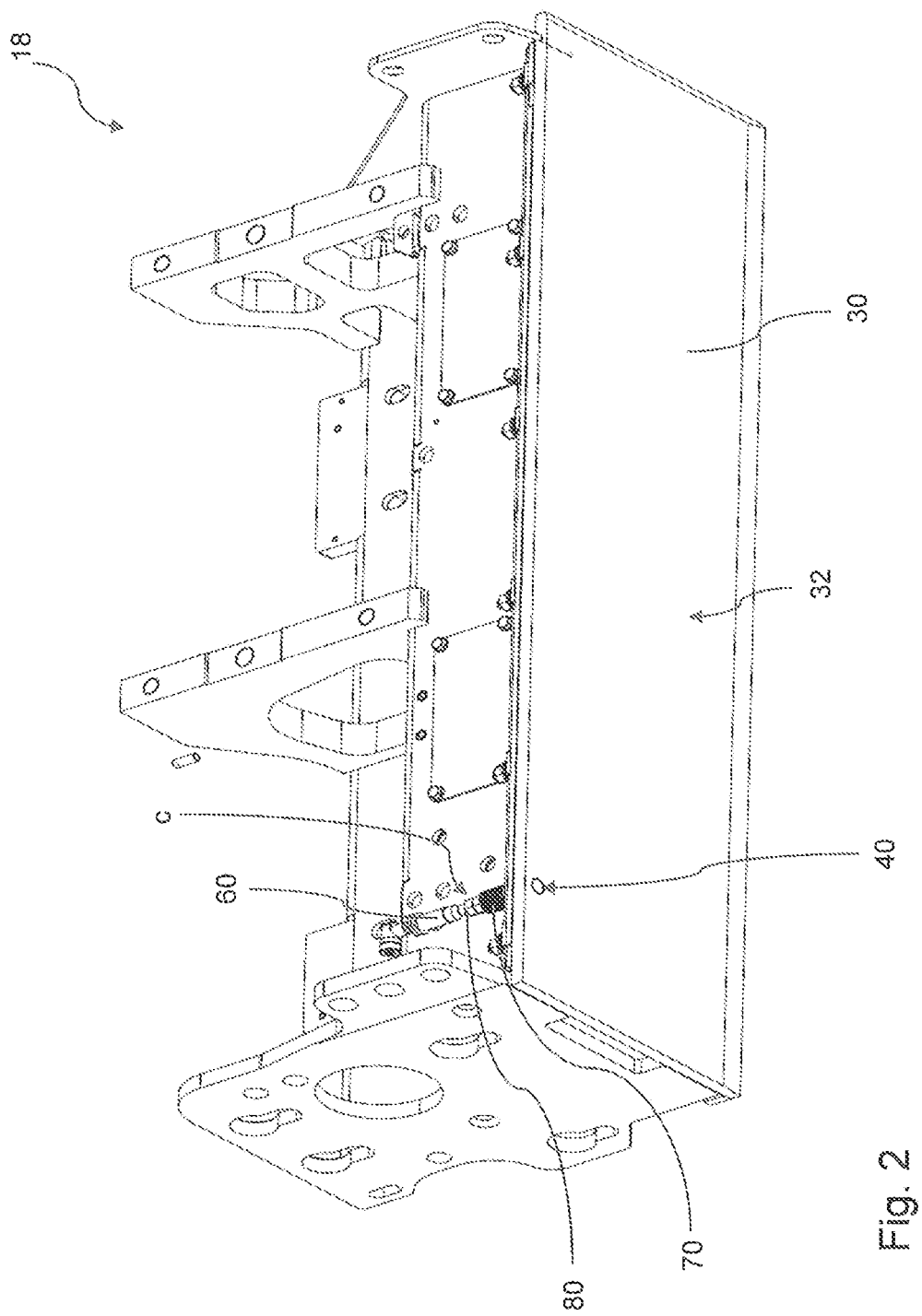
FIG. 2 is a perspective view of a screed according to a preferred embodiment.

FIG. 2 is a perspective view of a screed according to a preferred embodiment. The function of screed 18 shown in FIG. 2 is substantially the same as described above with respect to the screed 18 of the paver 10 of FIG. 1. Such screed 18 may have any configurations known from the prior art. In particular, screed 18 of FIGS. 1 and 2 may be a single or a multiple sections screed.

Screed 18 may include a screed extension provided behind and adjacent to each of the left and right main screed sections. The screed extensions may be slidable moveable laterally between retracted and extended positions such that varying width of paving material can be laid. The lateral movement of the extensions of the screed 18 may be driven by a respective screed with actuator. Although not shown in FIG. 2, each of a screed 18 and possible extendable extension screeds and other possible screed broadening parts may be provided with at least one system for monitoring the wear of the screed base plate 30 which, when being in use, has a surface 32 being exposed to abrasive wear due to the contact with the paving material deposited below screed base plate 30 of screed 18.

Figure 3:
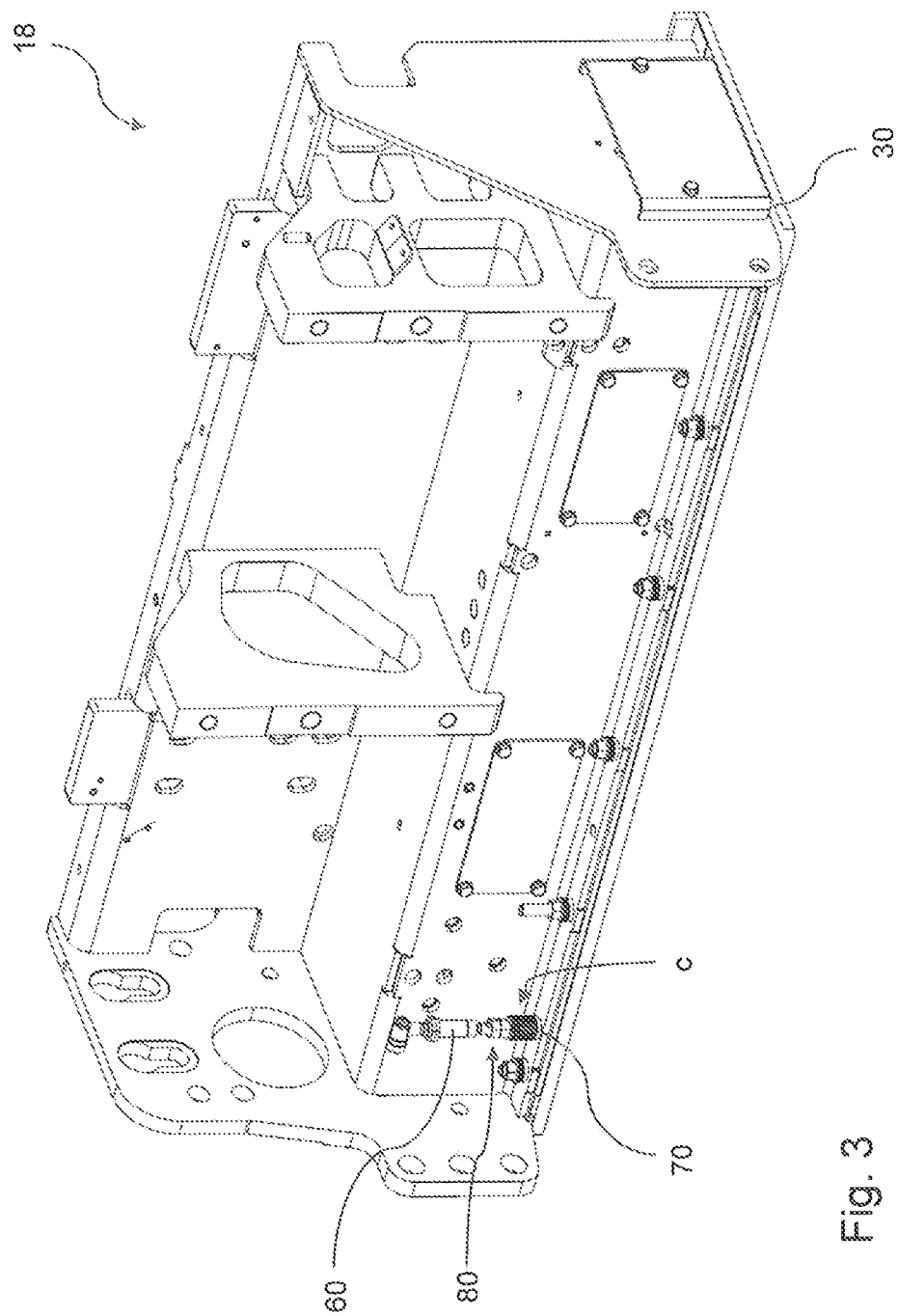
FIG. 3 is another perspective view of the screed of FIG. 2.

FIG. 3 is another perspective view of the screed of FIG. 2.

Figure 4:
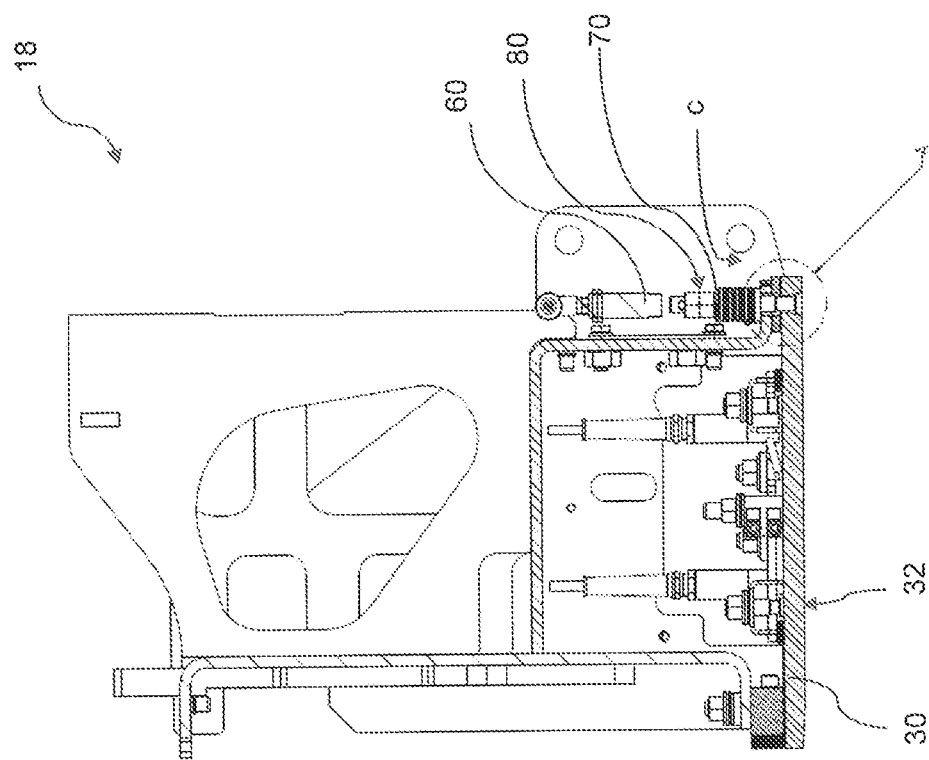
FIG. 4 is side view of the screed of FIGS. 2 and 3.

FIG. 4 is side view of the screed of FIGS. 2 and 3.

Figure 5:
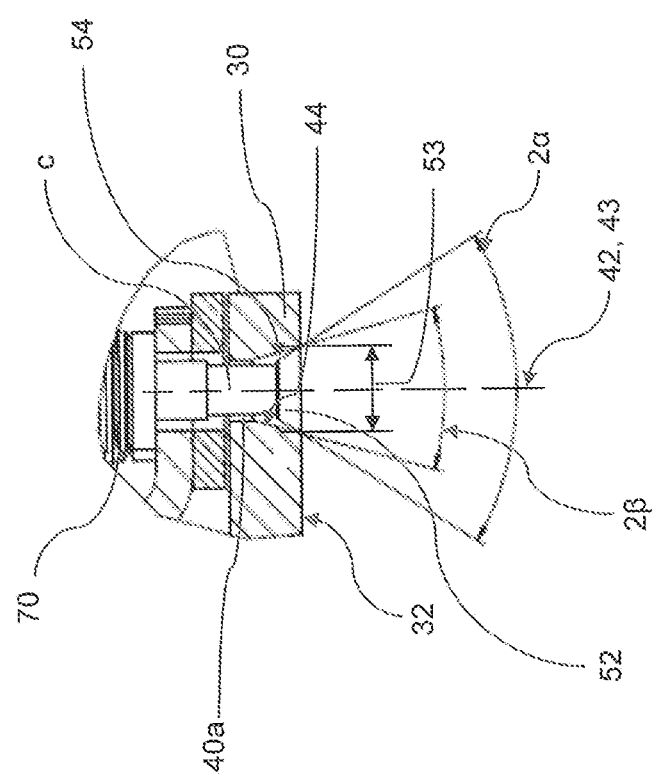
FIG. 5 is a cross section of part A of FIG. 4.

FIG. 5 is a cross section of part A of FIG. 4. In FIG. 5 the double arrow 2α shows two times a first angle α. The double arrow 2β shows two times a second angle β. In the embodiment of FIG. 5 the first angle α is about 30 degrees, and the second angle β is about 15 degrees, so that the first angle α is about 15 degrees bigger than the second angle β.

The system for monitoring the wear of the screed base plate 30 shown in FIGS. 2 to 5 comprises a through boring 40 in the solid plate, the boring 40 having a boring longitudinal axis 42, a substantially cylindrical part 40a, and an end part 41 adjacent said surface 32, the end part 41 having an end part surface 44 being at least partly conical in cross-section along the boring longitudinal axis 42. The system further comprises a counter-sunk head screw c having a screw longitudinal axis 43, a shaft 50 fitting into the cylindrical part 40a of the boring 40, and a head 52 with an underside 54 being at least partly conical in cross-section along the screw longitudinal axis 43. The system is characterized in that a first angle α between the underside 54 and the screw longitudinal axis 43 is bigger than a second angle β between the surface 44 of the end part 41 and the boring longitudinal axis 42, and that a sensor 60 is positioned at a fixed position on a side of the solid plate being opposite to said surface 32 and being adapted to measure a change x of a distance between a tip 51 of the screw c and the sensor 60.

As in particular shown in FIG. 5, by having a first angle α between the underside 54 and the screw c longitudinal axis 42 bigger than a second angle β between the surface 32 of the end part 41 and the boring longitudinal axis 42, it is avoided a surface 32 contact between the underside 54 and the surface 32 of the end part 41, when the screw c is positioned into the through boring 40 with the shaft 50 of the screw c fitting into the cylindrical part 40a of the boring 40, for use. Instead, by having a first angle α between the underside 54 and the screw c longitudinal axis 42 bigger than a second angle β between the surface 32 of the end part 41 and the boring longitudinal axis 42 it is provided a line contact between these surfaces. When being in use, the screw c is positioned into the through boring 40 with, preferably an unthreaded part of, the shaft 50 of the screw c fitting into a preferably unthreaded cylindrical part 40a of the boring 40, so that the head 52 of the screw c, in particular a head 52 surface 32 of the head 52 of the screw c, is part of the surface 32 being exposed to wear, when the solid plate 30 is in use. The effect of the afore-mentioned line contact leads to the further advantageous effect that wear of the head 52 of the screw c makes a width of the head 52 surface 32 smaller, the width 53 being a width being measured lateral to the longitudinal axis 42 of the screw c. And the reduction in width caused by said wear leads to the further advantageous effect that a circumference of the line contact of the head 52 of the screw c with the conical part 44 of the boring 40 is reduced. This leads to the further advantageous effect that the screw c can move along the conical part 44 of the end part 41 surface 32 of the boring 40 in a direction away from the surface 32 being exposed to wear. And that leads to the further advantageous effect the tip 51 of the screw c is moved, in particular moved by the forces causing the abrasion, nearer to the sensor 60 which reduction in distance can be measured by the sensor 60.

Preferably, the difference in degrees between the first angle α and the second angle β is adapted so that a change x of the position of the tip 51 of the screw c relative to the sensor 60 is not proportional to an amount y of wear of the surface 32 being exposed to the abrasive wear, when the screw c being inserted into the boring 40 so that the head 52 of the screw c is also being exposed to the abrasive wear.

Preferably, the difference in degrees between the first angle α and the second angle β is adapted so that a change x of the position of the tip 51 of the screw c relative to the sensor 60 is less than a reduction y of a thickness of the plate due to the abrasive wear, when the screw c being inserted into the boring 40 so that the head 52 of the screw c is also being exposed to the abrasive wear.

Figure 6:
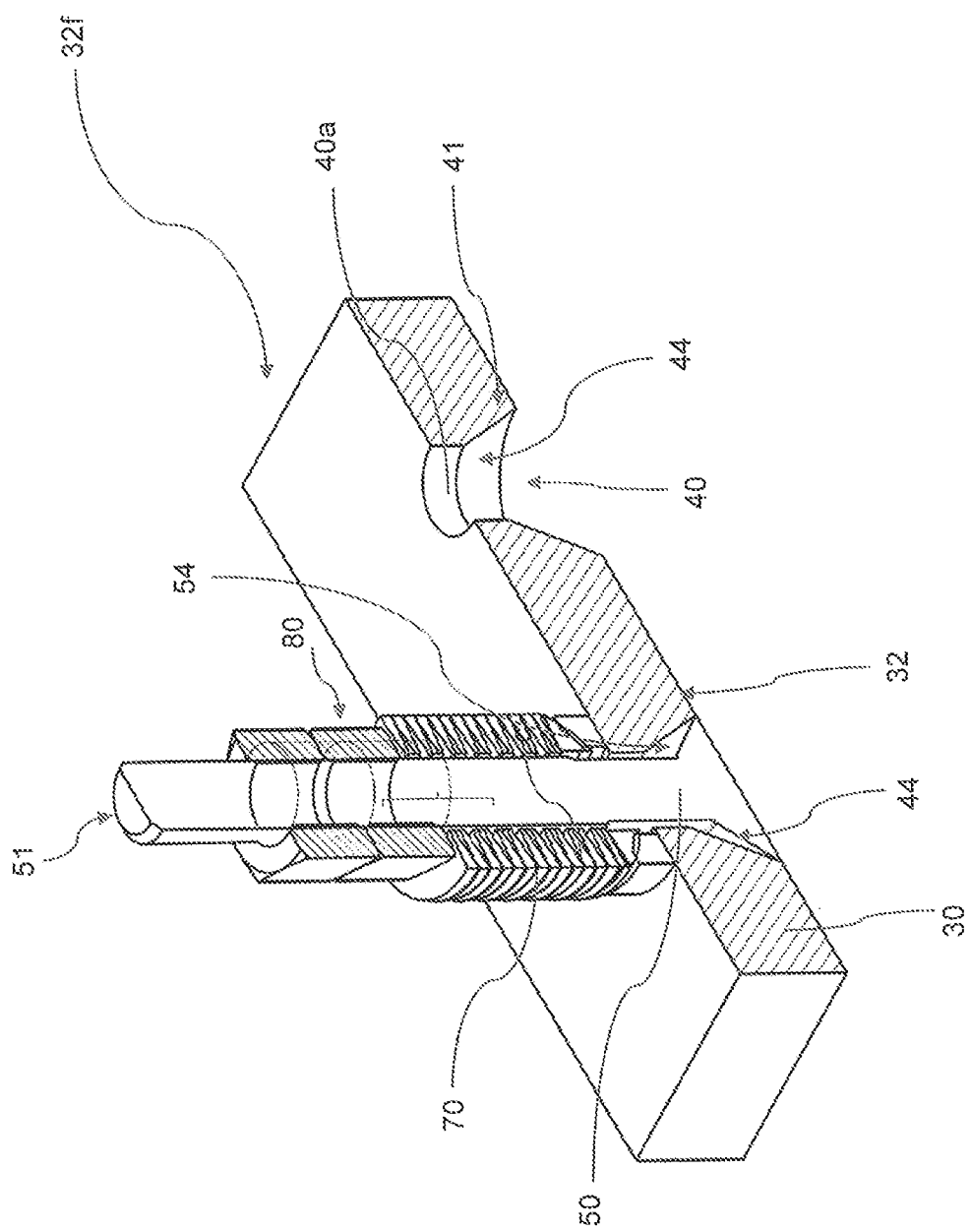
FIG. 6 is a schematic and perspective view of a system according to a preferred embodiment.

FIG. 6 is a schematic and perspective view of a system according to a preferred embodiment. In the embodiment of the system shown in FIG. 6, when the screw c being inserted into the boring 40, the screw c is exposed to a pulling force F of the solid plate which pulling force F is adapted to pull the screw c into the boring 40, so that the underside 54 of the screw c comes into contact a with a conical section of the end part surface 44 of the boring 40, preferably the pulling force F acting along a direction substantially parallel to the boring longitudinal axis 42.

To provide the afore-mentioned pulling force F the embodiment shown in FIG. 6 comprises a spring 70 being located on a side of the solid plate being a far side 32f with respect to the surface 32 being exposed to the abrasive wear, wherein, when the screw c being inserted into the boring 40, the spring 70 is adapted to expose the screw c to a pulling force F pulling the screw c into the boring 40, so that the underside 54 of the screw c comes into, preferably line-like, contact a with a conical section of the end part surface 44 of the boring 40, preferably along a direction substantially parallel to the boring longitudinal axis 42.

According to the embodiment shown in FIG. 6, the screw c comprises an abutment element 80, the abutment element 80 being located adjacent the tip 51 of the screw c on a side of the plate being a far side 32f with respect to the surface 32, the abutment element 80 being mounted on the screw c so that it can not move along the screw c, in particular not along a direction substantially parallel to the boring longitudinal axis 42, wherein the abutment element 80 is preferably comprising a nut and a counter nut.

As shown in the embodiment of FIG. 6, the spring 70 is clamped between the solid plate and the abutment element 80.

As in particular shown in the right part of the illustration of the embodiment of FIG. 6, the end part surface 44 of the boring 40 and/or the underside 54 of the head 52 of the screw c is substantially smooth, for example smooth like a typical industrial metal surface, for providing that a change x of the position of the tip 51 of the screw c relative to the sensor 60 is taking place substantially stepless and/or is taking place in substantially infinite small steps, when the screw c being inserted into the boring 40 so that the head 52 of the screw c is also being exposed to the abrasive wear. Preferably, the sensor 60 is a proximity sensor.

Preferably, the system shown in FIG. 6, in particular the sensor 60, being adapted to provide the change of the distance x wirelessly to a control unit and/or a customer of the system and/or a dealer of the system.

Figure 7:
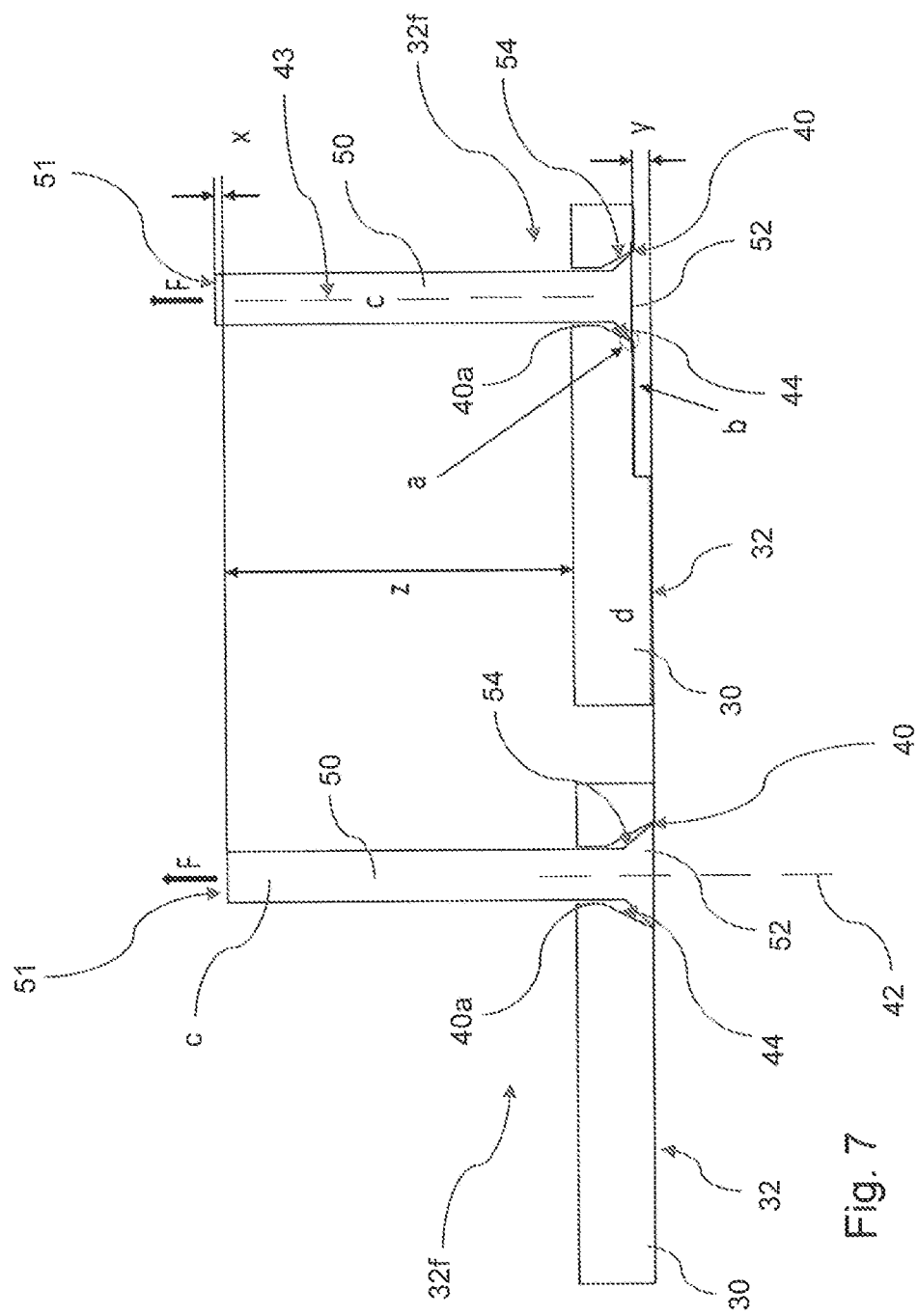
FIG. 7 is a schematic cross section schematically shown to conditions of a system according a preferred embodiment.

FIG. 7 is a schematic cross section schematically showing two conditions of a system according a preferred embodiment. The afore-mentioned two conditions are depicted by a first condition on the left side of FIG. 7 and a second condition on the right side of FIG. 7. In the condition on the left side of FIG. 7 this screw c is shown with the surface of head 52 being aligned with the surface 32 being exposed to abrasive wear. Accordingly, there is a circumferential line contact between the lower border of the underside 54 of head 52 and the conical surface 44 of the boring 40.

As soon as abrasive wear starts to act on surface 32 being exposed to such abrasive wear, such wear will remove material from screed base plate 30 so that the thickness d of screed base plate 30 is reduced by a length y indicated in the right hand side of FIG. 7 in the area b indicating the area of abrasive wear. Accordingly, the contact line being indicated by a in the cross section of the right hand drawing of FIG. 7 is moving along the longitudinal axis 42 of the boring 40 in z-direction causing the tip 51 of screw c moving by a distance x in the same direction to the top of the right hand side drawing of FIG. 7.

As can be seen in the right hand side drawing of FIG. 7 the distance x is smaller than the distance y so that a change x of the position of the tip 51 of screw c relative to the sensor 60 not depicted in FIG. 7 is less than a reduction y of a thickness d of the plate 30 due to the abrasive wear, when the screw c being inserted into the boring 40 so that the head 52 of the screw c is being exposed to abrasive wear as shown in FIG. 7.

Figure 8:
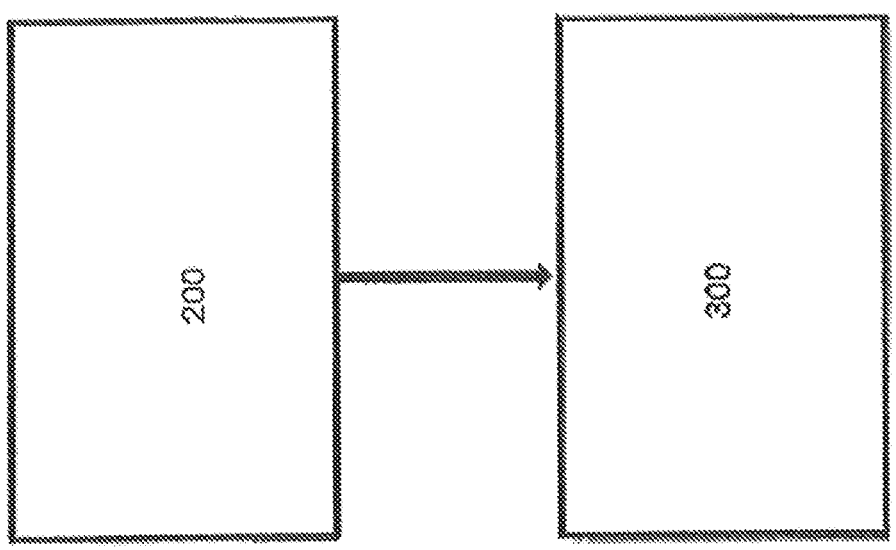
FIG. 8 is a schematic illustration of a method according to a preferred embodiment.

FIG. 8 is a schematic illustration of a method according to a preferred embodiment. The embodiment of the method schematically illustrated in FIG. 8 is a method for monitoring the wear of a solid plate, when being in use, has a surface 32 being exposed to abrasive wear, the solid plate being in particular a metal plate of a vehicle, more particularly being a screed base plate 30 and/or a conveyor plate of a paver 10, the method comprising the steps of: using 200 a system, in particular of a system according to any one of the embodiments described above with reference to FIGS. 1 to 7, comprising: a through boring 40 in the solid plate, the boring 40 having a boring longitudinal axis 42, a substantially cylindrical part 40a, and an end part 41 adjacent said surface 32, the end part 41 having an end part surface 44 being at least partly conical in cross-section along the boring longitudinal axis 42, and a counter-sunk head screw c having a screw longitudinal axis 43, a shaft 50 fitting into the cylindrical part 40a of the boring 40, and a head 52 with an underside 54 being at least partly conical in cross-section along the screw longitudinal axis 43, wherein a first angle α between the underside 54 and the screw longitudinal axis 43 is bigger than a second angle between the surface 44 of the end part 41 and the boring longitudinal axis 42, characterized by measuring 300 a change x of a distance between a tip 51 of the screw c and a sensor 60 being positioned at a fixed position on a side 32f of the solid plate being opposite to said surface 32.

The invention claimed is:

1. A system for monitoring the wear of a solid plate which, when being in use, has a surface being exposed to abrasive wear, the solid plate being a metal plate of a vehicle, the system comprising:

a through boring in the solid plate, the boring having a boring longitudinal axis, a substantially cylindrical part, and an end part adjacent said surface, the end part having an end part surface being at least partly conical in cross-section along the boring longitudinal axis, and a counter-sunk head screw having a screw longitudinal axis, a shaft fitting into the cylindrical part of the boring, and a head with an underside being at least partly conical in cross-section along the screw longitudinal axis, wherein a first angle between the underside and the screw longitudinal axis is bigger than a second angle between the surface of the end part and the boring longitudinal axis, and a sensor is positioned at a fixed position on a side of the solid plate being opposite to said surface and being adapted to measure a change of a distance between a tip of the screw and the sensor.

2. The system according to claim 1, wherein the first angle is about 15 degrees bigger than the second angle, the first angle being about 30 degrees, and the second angle being about 15 degrees.

3. The system according to claim 1, wherein the difference in degrees between the first angle and the second angle is adapted so that a change of the position of the tip of the screw relative to the sensor is not proportional to an amount of wear of the surface being exposed to the abrasive wear, when the screw is inserted into the boring so that the head of the screw is also being exposed to the abrasive wear.

4. The system according to claim 1, wherein the difference in degrees between the first angle and the second angle is adapted so that a change of the position of the tip of the screw relative to the sensor is less than a reduction of a thickness of the plate due to the abrasive wear, when the screw is inserted into the boring so that the head of the screw is also being exposed to the abrasive wear.

5. The system according to claim 1, wherein, when the screw is inserted into the boring, the screw is exposed to a pulling force of the solid plate which pulling force is adapted to pull the screw into the boring, so that the underside of the screw comes into contact with a conical section of the end part surface of the boring.

6. The system according to claim 1, further comprising a spring being located on a side of the solid plate being a far side with respect to the surface being exposed to the abrasive wear, wherein, when the screw is inserted into the boring, the spring is adapted to expose the screw to a pulling force pulling the screw into the boring, so that the underside of the screw comes into contact with a conical section of the end part surface of the boring along a direction substantially parallel to the boring longitudinal axis.

7. The system according to claim 6, wherein the spring is clamped between the solid plate and an abutment element.

8. The system according to claim 1, wherein the screw comprises an abutment element, the abutment element being located adjacent the tip of the screw on a side of the plate being a far side with respect to the surface, the abutment element being mounted on the screw so that it cannot move along the screw, andin particular not along a direction substantially parallel to the boring longitudinal axis.

9. The system according to claim 1, wherein the end part surface of the boring and/or the underside of the head of the screw is substantially smooth, for providing that a change of the position of the tip of the screw relative to the sensor is taking place substantially stepless and/or is taking place in substantially infinite small steps, when the screw is inserted into the boring so that the head of the screw is also being exposed to the abrasive wear.

10. The system according to claim 1, wherein the sensor is a proximity sensor.

11. The system according to claim 1, wherein the sensor is adapted to provide the change of the distance wirelessly to a control unit and/or a customer of the system and/or a dealer of the system.

12. A solid plate being a metal plate of a vehicle, the solid plate comprising a system according to claim 1.

13. A vehicle, comprising a system according to claim 1.

14. A method for monitoring the wear of a solid plate according to claim 12, the method comprising the step of: measuring a change of a distance between the tip of the screw and the sensor of the system.

15. A computer program stored on a non-transitory computer readable medium, the computer program for performing the steps of claim 14 when the computer program is run on a computer.

16. A non-transitory computer readable medium carrying a computer program for performing the steps of claim 14 when the computer program is run on a computer.

17. A control unit comprising at least one processor and at least one non- transitory computer-readable medium storing instructions that, when executed by the at least one processor, cause the control unit to perform the steps of claim 14.

* * * * *